W. H. MILLER.
PIPE DAMPER AND MOUNTING.
APPLICATION FILED FEB. 4, 1911.

1,012,266.

Patented Dec. 19, 1911.

WITNESSES:
J. H. Gardner.
K. R. Woddell.

INVENTOR:
William H. Miller,
BY
E. T. Silvius,
ATTORNEY.

COLUMBIA PLANOGRAPH CO., WASHINGTON, D. C.

UNITED STATES PATENT OFFICE.

WILLIAM H. MILLER, OF CRAWFORDSVILLE, INDIANA, ASSIGNOR OF ONE-HALF TO ARTHUR H. KOHLS, OF CRAWFORDSVILLE, INDIANA.

PIPE-DAMPER AND MOUNTING.

1,012,266. Specification of Letters Patent. Patented Dec. 19, 1911.

Application filed February 4, 1911. Serial No. 606,466.

*To all whom it may concern:*

Be it known that I, WILLIAM H. MILLER, a citizen of the United States, residing at Crawfordsville, in the county of Montgomery and State of Indiana, have invented a new and useful Pipe-Damper and Mounting, of which the following is a specification, reference being had to the accompanying drawings and to the letters and figures of reference marked thereon.

This invention relates to dampers or regulators for various kinds of pipes or conduits, such as stove pipes or air-ducts, the invention having reference more particularly to means for mounting the dampers in the pipes.

The object of the invention is to provide an improved damper of the above-mentioned character and means for mounting the same which shall be adapted to be placed in the joint where two sections of pipe are connected together without requiring alterations of the pipe sections, a further object being to provide an improved damper and mounting therefor that will be adapted to be manufactured and sold complete and ready for connection with pipes by unskilled workmen; a still further object being to provide an improved damper that may be depended upon to operate smoothly and reliably and not be liable to change position when in use.

With the above-mentioned and minor objects in view, the invention comprises a novel form of joint-ring adapted to be connected to two sections of pipe, and a damper of novel construction mounted in the joint-ring; and the invention consists further in the parts, and combinations and arrangements of parts, as hereinafter particularly described and claimed.

Figure 1:
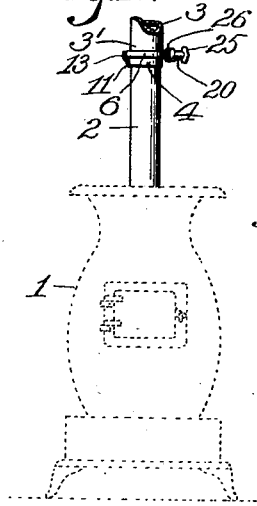
Figure 2:
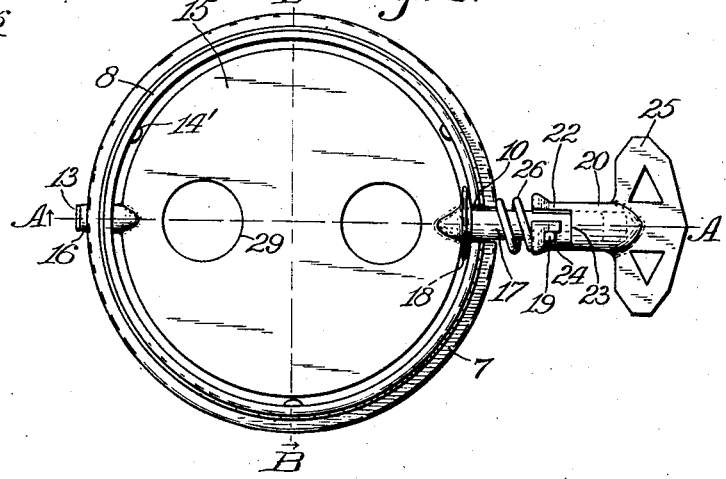
Figure 3:
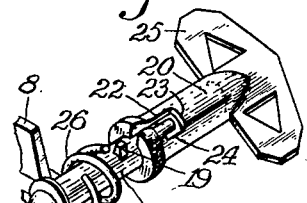
Figure 4:
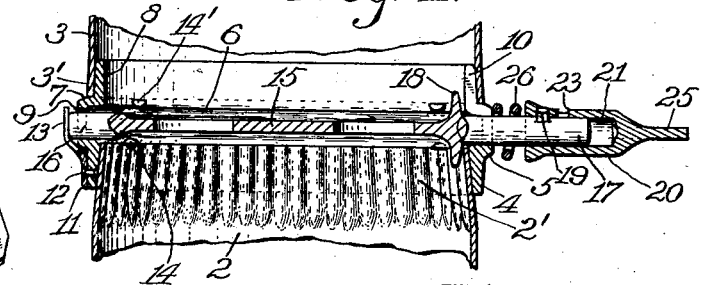
Figure 5:
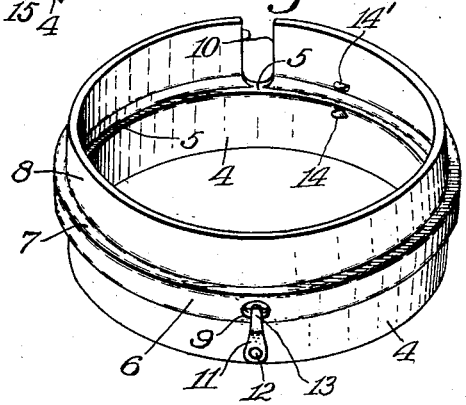
Figure 6:
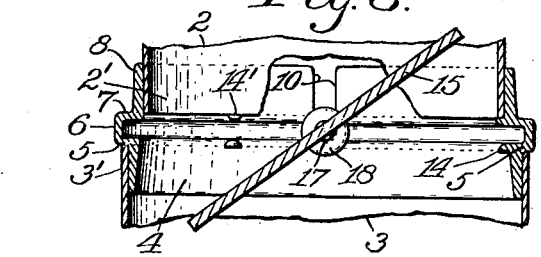
Figure 7:
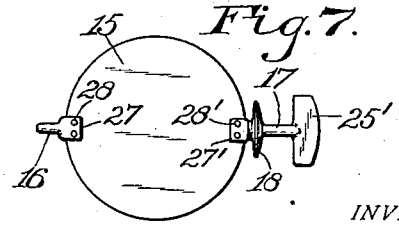

Referring to the drawings, Figure 1 is an elevation of a portion of a stove pipe with which the invention is connected and the stove shown by broken lines, as illustrating one of the purposes of the invention and manner of applying the same; Fig. 2, a top plan of the joint-ring and the damper mounted therein; Fig. 3, a fragmentary perspective view of operating portions of the invention; Fig. 4, a vertical section on the line A A in Fig. 2, showing portions of pipe sections connected to the joint-ring; Fig. 5, a perspective view of the joint-ring; Fig. 6, a vertical section on the plane of the line B B in Fig. 2; showing the portions of pipe sections connected to the joint-ring differently from that shown in Fig. 4; and Fig. 7, a plan of the damper slightly modified.

Similar reference characters in the different figures of the drawings indicate like elements or features of construction herein referred to.

In the drawings, the numeral 1 indicates a stove; 2, a section of pipe connected to the stove and having a relatively small end 2′; 3, indicating another section of pipe having a slightly enlarged end 3′ adapted to receive the smaller end of another section of the pipe in the usual manner.

The joint ring comprises a cylindrical portion 4 which is adapted to receive the smaller end 2′ of a pipe section as in Fig. 4, or may be inserted into the end 3′ of a relatively larger section as in Fig. 6, a flange-like portion 5 extending outward from the portion 4 and adapted to constitute a shoulder against which the end of the pipe section may be stopped. A cylindrical portion 6 extends from the flange-like portion 5, being slightly greater in diameter than the portion 4, and a flange-like portion 7 extends inward from the portion 6 to form a shoulder against which the end of a pipe section may be stopped, a cylindrical portion 8 extending from the flange-like portion 7, the portion 8 being adapted to be inserted into the larger end portion 3′ of the pipe section 3, as in Fig. 4, or to receive the smaller end 2′ of the pipe section, as in Fig. 6. As preferably designed the ring is so proportioned that the portion 4 receives the smaller end of a section of pipe, and the portion 8 enters the opposite or larger end of a contiguous section of pipe, so that two sections of pipe connected together as usual may be disconnected and drawn slightly apart and the ring readily connected thereto. The relatively large cylindrical portion 6 is substantially midway of the ends of the ring and has a circular aperture 9 therein which constitutes a journal bearing at one side of the ring, and the cylindrical portion 8 has a slot 10 which extends from the end thereof inward to the flange-like-portion 5 at the opposite side of the ring to form a journal-bearing. A plate spring is provided which comprises a shank 11 which is secured to the outer side of the portion 4 of the ring by means of a rivet 12 and has an elastic tongue 13 thereon extending opposite the portion 6 and the aperture 9. The inner side of the cylindrical portion 4 has a suitable number of projections 14 thereon at the plane of the flange-like portion 5, and the portion 8 of the ring has similar projections 14′ on the inner side thereof on the plane of the flange-like portion 7, to constitute stops for the sections of pipe when inserted into the joint-ring in case the sections fit loosely therein.

The damper 15 comprises a disk-shaped plate having a trunnion 16 on one side thereof which is inserted into the aperture 9 against the spring tongue 13, the opposite side of the damper having a relatively longer trunnion 17 thereon which is inserted in the slot 10 and has a collar 18 thereon which is normally forced by the spring-tongue 13 against the inner side of the joint-ring, so as to frictionally hold the damper in the position in which it may be placed. The trunnion or shaft 17 preferably has a lug 19 thereon to enable the trunnion to be controlled or moved rotatively, the trunnion or shaft preferably being provided with a detachable handle which comprises a shank 20 having a socket 21 therein to receive the end portion of the trunnion or shaft, the wall of the shank having a longitudinal slot 22 extending from its open end to receive the lug 19, a slot 23 extending transversely from the slot 22 and a recess 24 extending from the side of the slot 23 toward the open end of the shank, so that when the shank is pushed onto the trunnion until the lug is stopped at the end of the slot 22, the shank may be rotated until the lug is stopped at the farther end of the slot 23, and then the shank may be moved outwardly to bring the lug into the recess 24, in which position it is apparent that the shank will rotate the trunnion or shaft, the shank having a cross-bar or handle 25 thereon. The shank is held in the position described relative to the trunnion or shaft by means of a coil-spring 26 placed on the trunnion against the joint-ring and the adjacent end of the shank 20, the spring serving also to cause frictional resistance to prevent accidental rotation of the trunnion and adapted to assist the spring tongue 13 in preventing accidental movement of the damper. In some cases, however, the spring 26 may be sufficient for the purpose and the spring tongue 13 may be dispensed with. Or, if desired, the spring-tongue may be employed and the spring 26 may be dispensed with, in which case a handle-bar 25′ may be formed integrally with the trunnion or shaft 17 in lieu of the separate detachably connected handle above described. Also in some cases the damper may be composed of cast metal with the trunnions cast integrally therewith, but it is apparent that if desired the damper may be composed of sheet metal and the trunnions 16 and 17 provided with ears 27 and 27′, respectively, and secured to the damper by means of rivets 28, 28′. The damper may be impeforate or it may have one or more perforations 29 therein. Preferably the interior of the cylindrical portion 4 of the joint ring is slightly conical, being relatively larger in diameter at its end, and the cylindrical portion 8 is conical externally, being relatively smaller in diameter at its end, so that the sections of pipe may be wedged tightly in connection with the joint-ring.

In practical use, there being ample bearing surface in the joint-ring for the trunnions or shaft of the damper, lost motion is not likely to result from frequent operations of the damper, and the latter is not liable to be opened to an undesirable extent by the air current, since ample frictional resistance is provided. In case the pipe deteriorates so as to become useless it is evident that the joint-ring and damper, being of substantial construction may be saved and used indefinitely with new pipe.

Having thus described the invention, what is claimed as new, is—

1. A pipe damper mounting comprising a ring having a slot extending from one end thereof to a point substantially midway between the two ends of the ring, said slotted end portion being conical exteriorly, the opposite end portion of the ring being conical interiorly, the middle portion of said ring opposite the slotted portion having a hole therein, and a plate spring comprising a shank that is secured to the outer side of said interiorly conical end portion, and an elastic tongue extending from said shank opposite the outer end of said hole.

2. The combination of a ring having an aperture in one portion and a slot in the opposite portion thereof, the slot extending from one end to the middle portion of the ring, said slotted end portion being conical exteriorly, the opposite end portion of the ring being conical interiorly, a damper having a trunnion thereon inserted in said aperture and also a trunnion inserted in said slot, one of the trunnions having a collar thereon adjacent the inner side of said ring, a handle on one of the trunnions, and a spring coöperating with the ring and one of the trunnions and forcing said collar against the inner side of said ring.

3. The combination of a ring having an aperture in one portion and a slot in the opposite portion thereof, the slot extending from one end to the middle portion of the ring, said ring being provided with stops arranged in planes at opposite sides of the aperture, said slotted end portion being conical exteriorly, the opposite end portion of the ring being conical interiorly, a damper having a trunnion theron inserted in said aperture and also a trunnion inserted in said slot, one of the trunnions having a collar thereon adjacent the inner side of said ring, a handle on one of the trunnions, and a spring coöperating with the ring and one of the trunnions and forcing said collar against the inner side of said ring.

4. The combination of a ring having an aperture in one portion and a slot in the opposite portion thereof, the ring being provided with stops arranged in planes at opposite sides of the aperture, one end portion of the ring being conical interiorly and the other end portion being conical exteriorly, a damper having a trunnion thereon inserted in said aperture and also a trunnion inserted in said slot, one of the trunnions having a collar thereon adjacent the inner side of said ring, a handle on one of the trunnions, a spring coöperating with the ring and one of the trunnions and forcing said collar against the inner side of said ring, a pipe section having an end inserted in said interiorly conical end portion, and a pipe section having an end receiving said exteriorly conical end portion of said ring.

In testimony whereof, I affix my signature in presence of two witnesses.

WM. H. MILLER.

Witnesses:
S. H. DRYBREAD,
J. S. FRANCIS.

Copies of this patent may be obtained for five cents each, by addressing the "Commissioner of Patents, Washington, D. C."